United States Patent

[11] 3,567,173

[72] Inventor Fred D. Peterson
 San Mateo, Calif.
[21] Appl. No. 646,588
[22] Filed June 16, 1967
[45] Patented Mar. 2, 1971
[73] Assignee Peterson Products of San Mateo, Inc.,
 Belmont, Calif.

[54] CORE MANDREL FOR MAKING HOLLOW PLASTIC BODIES
4 Claims, 4 Drawing Figs.

[52] U.S. Cl..................................................... 249/183,
 156/219
[51] Int. Cl..................................................... B29c 1/12
[50] Field of Search.......................................... 249/48, 65,
 150, 183, 184, 175; 18/5 (M), 45 (M), (Stretch
 Digest), (Core Position Digest), (Expansible and
 Collapsible Digest); 25/128 (D), 128 (K), 128
 (R), 128 (S), 128.1; 156/198, 219, 324

[56] References Cited
 UNITED STATES PATENTS
2,170,188 8/1939 Cobi............................ 249/65
3,350,049 10/1967 Reiland....................... 249/48

Primary Examiner—J. Spencer Overholser
Assistant Examiner—Lucius R. Frye
Attorney—Townsend and Townsend ABSTRACT: A mandrel for use in making hollow reinforced plastic parts, which diametrically shrink during the curing cycle. The mandrel has an inner rigid core structure around which is laminated a thick layer of foam rubber to which is bonded sections of aluminum foil with their adjoining edges separated by longitudinal gaps to act as expansion joints and permit the metal sections to move closer together under influence of the diametral contraction of the plastic during its curing cycle.

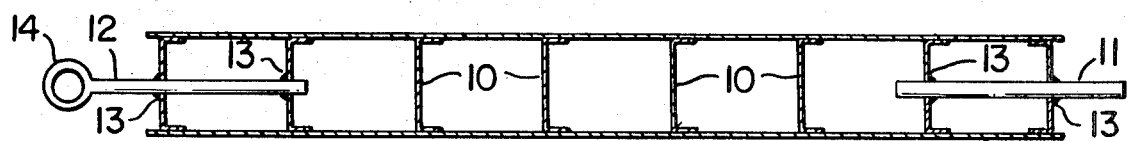
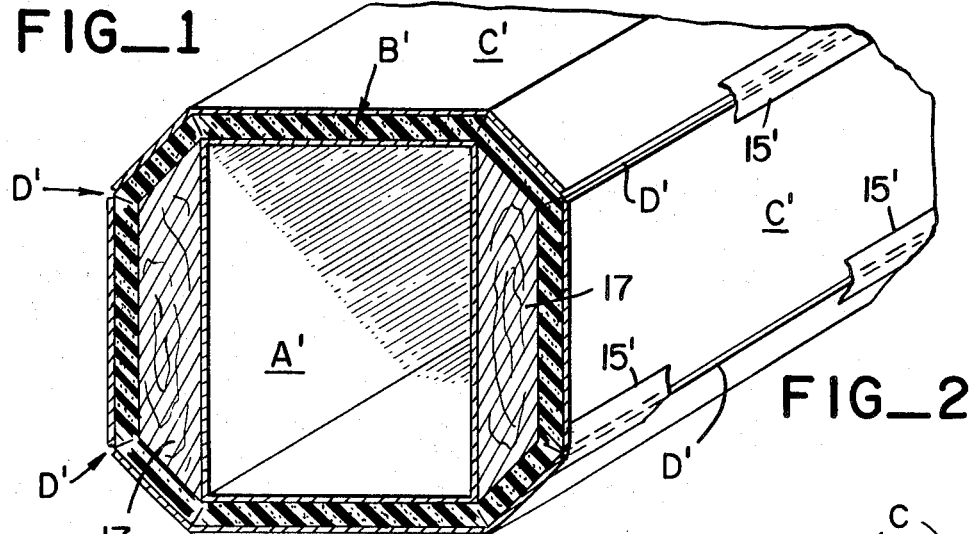
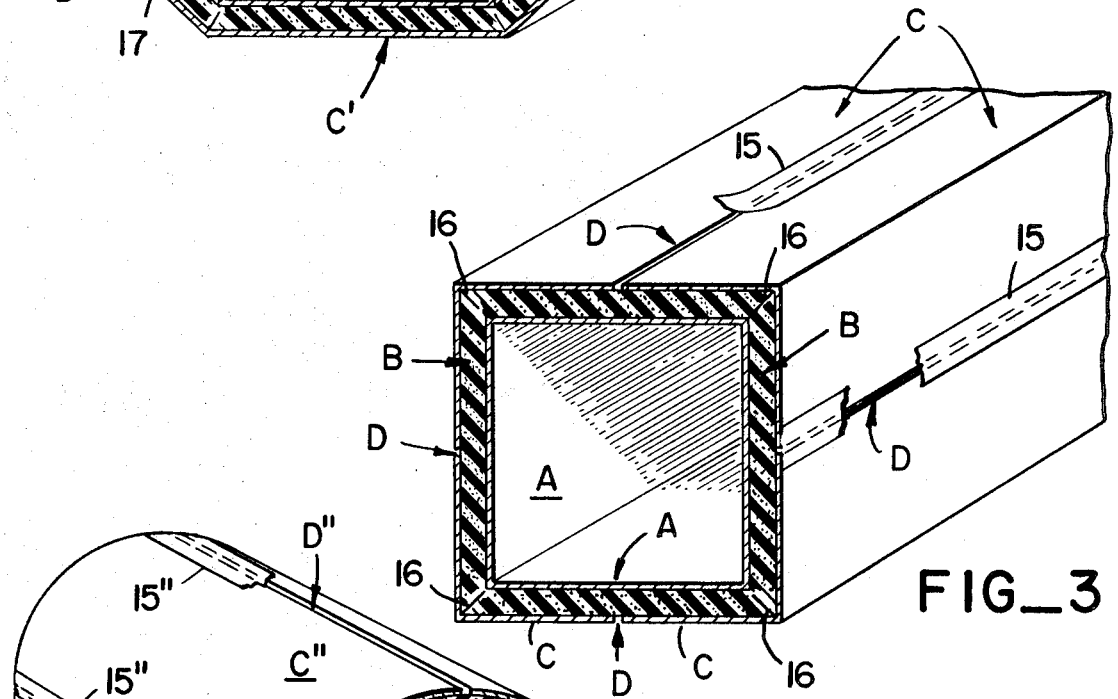
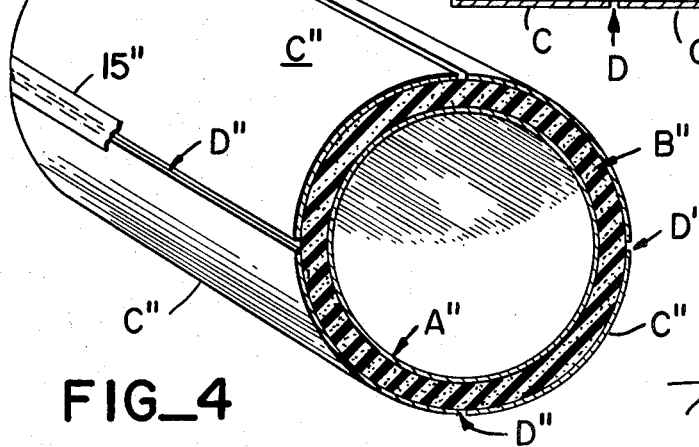
INVENTOR.
FRED D. PETERSON
BY
Townsend and Townsend
ATTORNEYS

CORE MANDREL FOR MAKING HOLLOW PLASTIC BODIES

This invention relates to a core mandrel useful in the fabrication of elongate tubular bodies from reinforced plastic materials.

It is well known to make elongate tubular bodies, such as for example hollow booms, from reinforced plastic materials such as synthetic resin-impregnated glass cloth and mat materials. It is the common practice of the industry to provide a polished steel mandrel over and around which may be laminated layers of wet plastic reinforced compositions by either the so-called "wet layup" process or the "sprayup" process. Reference is made to U.S. Pat. No. 2,933,125 and No. 2,787,314, issued to David Anderson, which generally describe these two processes that are commonly known and practiced in the industry.

In the fabrication of tubular reinforced plastic articles by either the wet layup or sprayup process using for example the combination of glass fiber reinforcement with liquid polyester resins, the resin shrinks during the drying and curing cycle which causes the tubular article to tightly contact around the supporting steel mandrel. If the steel mandrel is not constructed properly or if it is not highly polished and treated properly with parting agents, difficulties can be encountered in removing the mandrel from the part after the plastic is dried and cured on the mandrel. Equally important is the fact that steel mandrels are very expensive to construct which renders their use economically prohibitive in low production items.

The principal object of the present invention is to provide a novel core mandrel construction which can be fabricated quite inexpensively and which eliminates the need for using the polished steel mandrels in use today.

The particular embodiment of the invention which is illustrated in the drawings and which will be described hereinafter in more detail comprises an interior core that can be fabricated from any cheap and readily available material such as sheet metal or plywood or the like. The outer surface of the core is covered with a layer of substantial thickness of resilient material such as for example foam rubber sheet material. A plurality of longitudinal sections of relatively inexpensive metallic sheet or foil material (such as aluminum foil) are laminated to the outer surfaces of the resilient layer and in such manner that the sections are separated by longitudinally extending expansion joints or seams located at least at every 90° of circumference or periphery around the mandrel.

The outer surfaces of the metallic foil sections treated with a suitable parting agent, define the exposed surfaces of the mandrel upon which the reinforced plastic part may be fabricated in conventional fashion by either the wet layup or sprayup process. When the wet reinforced plastic part on the mandrel diametrally shrinks and contracts during the curing process, the metal sections of the mandrel can correspondingly move inwardly and closer together against the relatively slight outward biasing pressure of the resilient layer and by virtue of the expansion joints or seams which are provided to permit the sections to move closer together under the force of the inward pressures exerted during the fabricating process.

Other objects and advantages of the invention will become apparent upon reading the following specification and referring to the accompanying drawings in which similar characters of reference represent corresponding parts in each of the several views.

In the drawings:

FIG. 1 is a longitudinal, sectional view of the inner core of box-type supporting member;

FIG. 2 is an enlarged, fragmentary, partly isometric transverse sectional view of the first embodiment of a core mandrel embodying the present invention;

FIG. 3 is similar to FIG. 2 showing a second embodiment of the invention; and

FIG. 4 is the same as FIG. 2 showing a third embodiment of the invention.

Referring now particularly to FIG. 3 of the drawings, the embodiment therein shown comprises an elongate inner hollow box-type structure indicated generally at A; a substantial thickness of resilient sheet material such as foam rubber indicated generally at B which is laminated over the entire periphery of the inner core A; a plurality of sections of nonresilient hard surface sheet material indicated generally at C laminated to the outer surfaces of the material B; and which said sections are separated by expansion joints or seams indicated generally at D.

The inner core, heretofore indicated generally at A, may be of any suitable construction adequate to provide suitable rigidity and structural support for the fabricated part. As shown in FIG. 1 said box-type structure may consist merely of a four-sided sheet metal box-type structure internally supported by welded braces, as indicated at 11 in FIG. 1. Such type of sheet metal construction indicated is common and well-known in the industry and no further detailed explanation is required. Further, the inner core A may be made of any suitable material in desired cross section, as for example out of plywood or the like.

A pair of oppositely endwise-extending supporting shafts 11 and 12 are provided to support the inner core adjacent its opposite ends on any suitable bearing surfaces (not shown) and preferably in such manner that the core mandrel may be rotated about its longitudinal axis during fabrication of the reinforced plastic part.

The shafts 11 and 12 are rigidly mounted to the inner core Member A and in the example shown, the shafts 11 and 12 are shown as projecting through the apertured braces 10 and rigidly mounted thereto as by welding 13.

One of the shafts 12 is provided with a hook or eye 14 which provides a means for withdrawing the mandrel from the finished reinforced plastic part after it has been fabricated and permitted to cure.

The layer of resilient sheet material, heretofore indicated generally at B, may comprise a thickness of conventional foam rubber, as for example a ½-inch thick layer of such material which can be adhesively bonded to the entire peripheral surface of the inner core A by any compatible and commercially available adhesive. The rubber sheet material may be relieved at its corners merely by slitting the material part way through its thickness such as indicated at 16.

A plurality of sections of hard surfaced material heretofore indicated generally at C may comprise relatively light gauge aluminum sheet or foil as for example .040 inch gauge aluminum foil bonded by suitable adhesive to the outer surfaces of the sponge rubber sheathing B.

It is noted that at every 90° of angular periphery there is provided a longitudinal expansion joint or seams, heretofore indicated at D, between the adjacent edges of the adjoining metal sections C. In fabricating reinforced plastic parts having an internal diameter of 6 inches to 12 inches, I have found that providing a gap or slot of approximately 1/16-inch between adjoining edges of the metal sections produces the desired result and objectives of permitting the sections to move closer together and, in effect, to diametrally contract when the reinforced plastic part that is being fabricated on the mandrel shrinks during the drying and curing cycle.

To prevent wet plastic materials from running or seeping into the expansion joint seams D, and yet without affecting the ability of the metal sections C to move closer together by virtue of the gaps or spaces between their adjoining edges, there is provided a flexible adhesive tape covering over each said joint. In this connection, I have found that a commercially available Teflon pressure-sensitive tape provides satisfactory results. It is relatively thin gauge, is inert to reaction of the usual reinforced plastic materials such as polyester resins and reagents and solvents used in connection therewith, and provides adequate adherence to the metal surfaces so that when the mandrel is withdrawn from the part the tape does not peel off.

Use of a mandrel constructed in accordance with the description given in respect to the embodiment of the invention in FIG. 3 may proceed just as if the mandrel were of the conventional polished steel type. More specifically, it will suffice to say that the outer surfaces of the metal section C are coated with suitable parting agents followed by gel coats to which is then laid up or sprayed up reinforced plastic materials such as a combination of glass fiber materials with polyester resins. When the reinforced plastic material has been applied to the mandrel to form a completed part, the plastic will diametrally shrink or contract during the curing cycle. As previously indicated, the pressure of such diametral contraction will cause the outer metal sections C of the mandrel to move inwardly and closer together against the slight outward biasing pressure of the resilient foam rubber layer B to which the metal sections C are laminated. The expansion joints or gaps D of course permit the movement of the metal sections D closer together to compensate for the contraction of the plastic material.

Once the plastic part has been permitted to sufficiently cure and dry to remove it from the mandrel, the eyelet 14 may be engaged by a suitable cable or winch mechanism and as the reinforced plastic part is held stationary, the entire mandrel may be withdrawn from the tubular reinforced plastic part. Not only does the layer of resilient material B permit diametral contraction of the mandrel during the curing cycle but the resiliency of the mandrel allows for easy withdrawal of the mandrel from the part.

FIGS. 2 and 4 of the drawings show how the principles of the present invention may be applied in fabricating core mandrels of different cross-sectional shapes. FIG. 2 shows a generally octagonal-shaped mandrel that can in all material respects be constructed substantially identically to the embodiment described in reference to FIG. 3. In this connection, FIG. 2 shows an inner core or box-type structure A' to the opposite sides of which may be bonded wooden filler blocks 17 to define the octagonal shape. A layer of foam rubber material B' is laminated around the periphery of the core structure and four sheet metal sections C' are in turn laminated to the outer surfaces of the rubber material B' and in such manner that at least four expansion joints D' are provided between adjoining edges of contiguous metal sections. In FIG. 2 the flexible tape 15' would normally be adhesively applied over each of the seams d'.

FIG. 4 shows a circular cross section mandrel in which the inner core A'' may be a light metal pipe or tube around which is laminated a foam rubber layer B'' and to which in turn is laminated four metal sections C' with expansion joints D'' provided therebetween and covered with flexible tape 15''.

Although the present invention has been described in detail by way of illustration and example, it is understood that various modifications may be made within the scope of the invention as limited only by the scope of the claims appended hereto.

I claim:

1. A core mandrel for making hollow bodies of plastic material of the type which shrink during their curing cycle, comprising: a rigid core, a layer of resilient material overlapping and bonded along the entire peripheral surface of said rigid core, a plurality of sections of nonresilient hard surface sheet material bonded to the outer surfaces of said resilient material, said plurality of sections separated by longitudinal expansion joints to allow said sections to move closer together against the outward biasing pressure of said resilient material and under influence of diametral contraction of plastic material applied thereto.

2. The combination of claim 1 and wherein each expansion joint constitutes a longitudinal space between adjacent edges of said adjoining sections and wherein each longitudinal space is covered by a strip of flexible tape.

3. The core mandrel of claim 1 wherein said bonding is accomplished with an adhesive.

4. The core mandrel of claim 1 wherein said expansion joints are spaced at about 90° intervals around the periphery of the mandrel.